Dec. 5, 1961  A. GANZENMÜLLER  3,011,319
METHOD AND APPARATUS FOR AMPHIBIOUSLY TRANSPORTING GOODS
Filed July 21, 1958  4 Sheets-Sheet 3

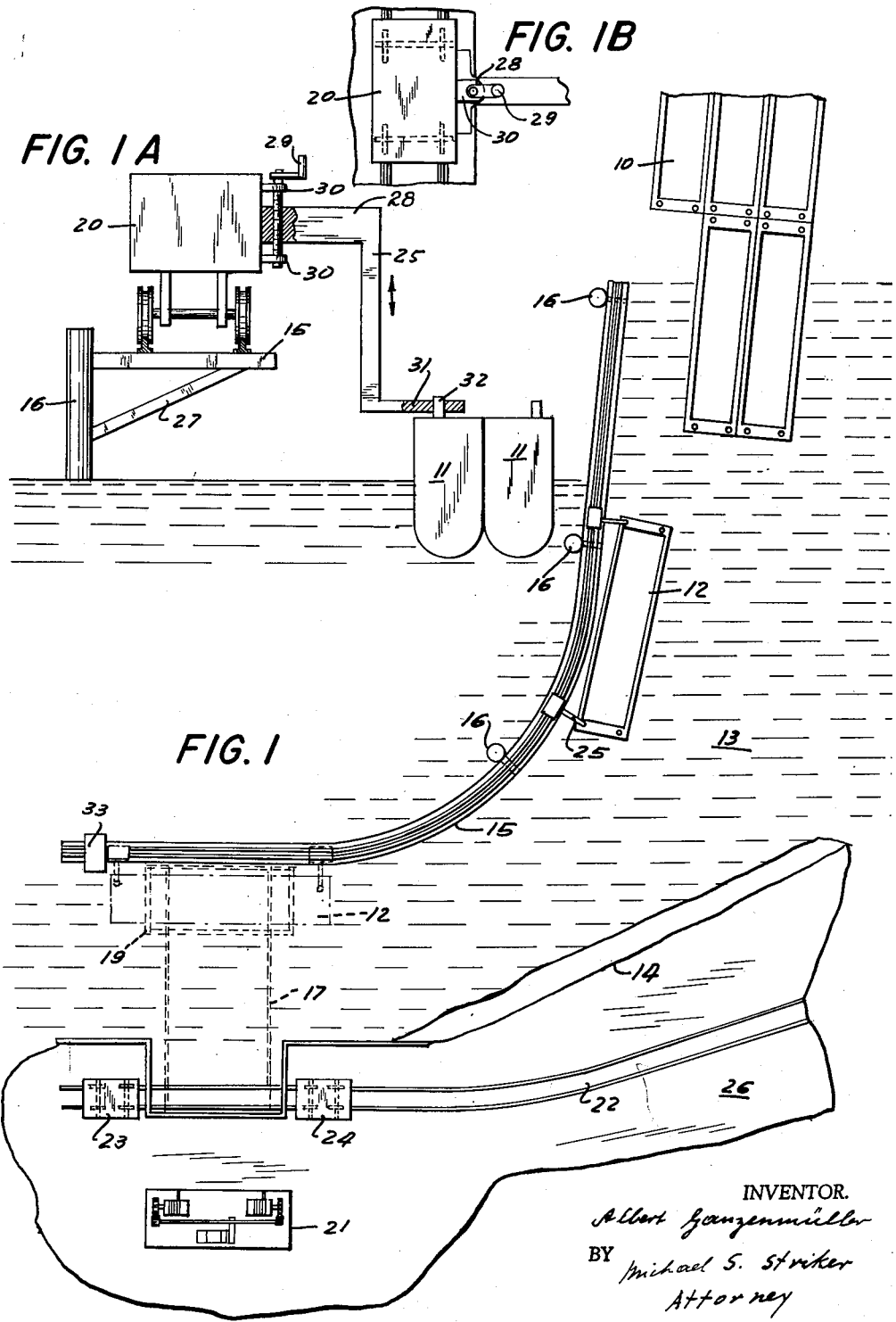

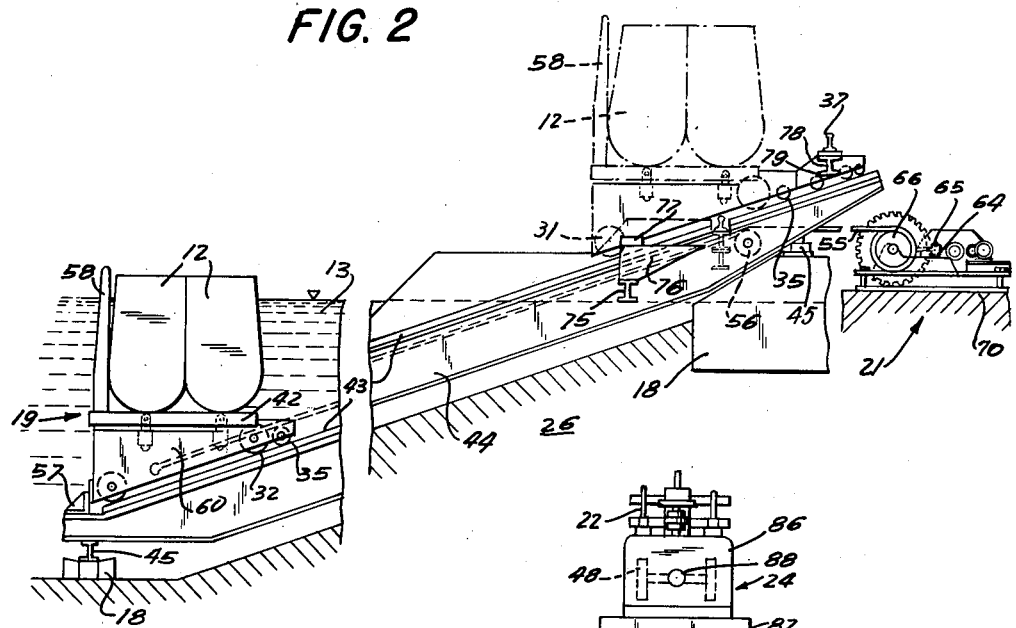
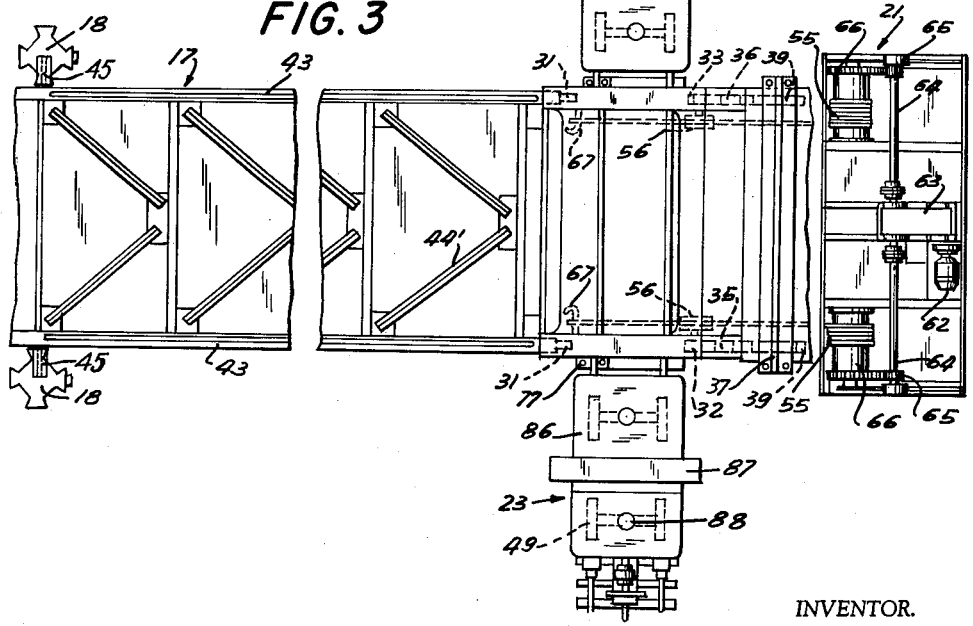

INVENTOR.
Albert Ganzenmüller
BY Michael S. Striker
Attorney

Dec. 5, 1961  A. GANZENMÜLLER  3,011,319
METHOD AND APPARATUS FOR AMPHIBIOUSLY TRANSPORTING GOODS
Filed July 21, 1958  4 Sheets-Sheet 4

INVENTOR.
Albert Ganzenmüller
BY Michael S. Striker
Attorney

United States Patent Office 3,011,319
Patented Dec. 5, 1961

3,011,319
METHOD AND APPARATUS FOR AMPHIBIOUSLY TRANSPORTING GOODS
Albert Ganzenmüller, Dortmund, Westphalia, Germany, assignor to Hoesch Werke Aktiengesellschaft, Dortmund, Germany, and Aktiengesellschaft fuer Berg- und Huellenbetriebe, Salzgitter, Germany
Filed July 21, 1958, Ser. No. 749,779
7 Claims. (Cl. 61—67)

The present invention relates to the transportation of goods.

At the present time, although it is desired to maintain in industrial practice all of the goods involved in any given industrial process in continuous movement at all times so as to provide the lowest possible cost in the manufacture of any given article, it is extremely difficult to attain this ideal of continuous flow of all of the goods where the goods must be transported in part on land and in part on sea. With the present stage of development of the transportation arts there is a delay and a necessary bottle neck and storing of goods when they are taken from a seagoing vessel and transferred to a landgoing vessel or when they are taken from a landgoing vessel and transferred to a seagoing vessel. While, because of these difficulties, certain plants are located directly at the shore of a body of water so that it is unnecessary to transport goods on land and such a plant can receive the goods directly from a vessel in the body of water, it is not always possible to locate plants next to a body of water, and this necessary transfer of goods between land- and sea-going vehicles is at the present time very costly and creates serious bottlenecks.

One of the primary objects of the present invention is to provide a method and apparatus capable of transporting goods both on land and on sea and capable of transferring the goods between the land and the sea with almost no delay.

Another object of the present invention is to provide a method and apparatus which makes it possible to transfer a vessel carrying a load of goods from the sea to the land and to convert the vessel into part of a landgoing vehicle in an extremely short time so that there is no delay such as that which would be necessarily caused by the unloading of the vessel and the transfer of the goods from the vessel to a different landgoing vehicle.

A further object of the present invention is to provide an apparatus capable of quickly and easily maneuvering vessels on a body of water so that the vessels are accurately positioned to be handled by further apparatus which transfer the vessels to the land where the vessels form part of a landgoing vehicle.

An additional object of the present invention is to provide a railroad track arrangement capable of participating in the transportation of goods from sea to land and vice versa.

It is still another object of the present invention to provide an apparatus of the above type which is extremely low in cost, which requires an extremely small space, which is extremely simple, and which is very reliable in operation.

It is a further object of the present invention to provide a method and apparatus for accomplishing the above objects which require an extremely small number of workers to carry out the method and operate the apparatus.

A still further object of the present invention is to provide in an apparatus of the above type a railroad track arrangement where a pair of tracks intersect each other and nevertheless do not interfere with the movement of carriages on the intersecting tracks.

With the above objects in view the present invention includes in an apparatus for amphibiously transporting goods a first track which extends between a body of water and an adjoining body of land and a second track intersecting the first track at substantially a right angle. A first carriage means is movable along the first track and a second carriage means is movable along the second track so that a vessel which is capable of floating on the body of water and which carries a load of goods can be transferred from one to the other of the carriage means either when the vessel moves from the land to the water or when the vessel moves from the water to the land, and a hydraulic means is provided for transferring the vessel between the carriage means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic plan view illustrating adjoining bodies of land and water and the arrangements of the structure of the present invention on the land and on the water;

FIG. 1A is a diagrammatic elevational view showing the manner in which parts of the structure of FIG. 1 cooperates with a vessel to maneuver the same into a desired position;

FIG. 1B is a top plan view of a vehicle shown in FIG. 1A;

FIG. 2 is a partly broken away side elevational view of a track arrangement according to the present invention, FIG. 2 also showing a carriage which moves along a track to raise a vessel out of the water and onto the land;

FIG. 3 is a top plan view of the structure of FIG. 2;

Figure 4:
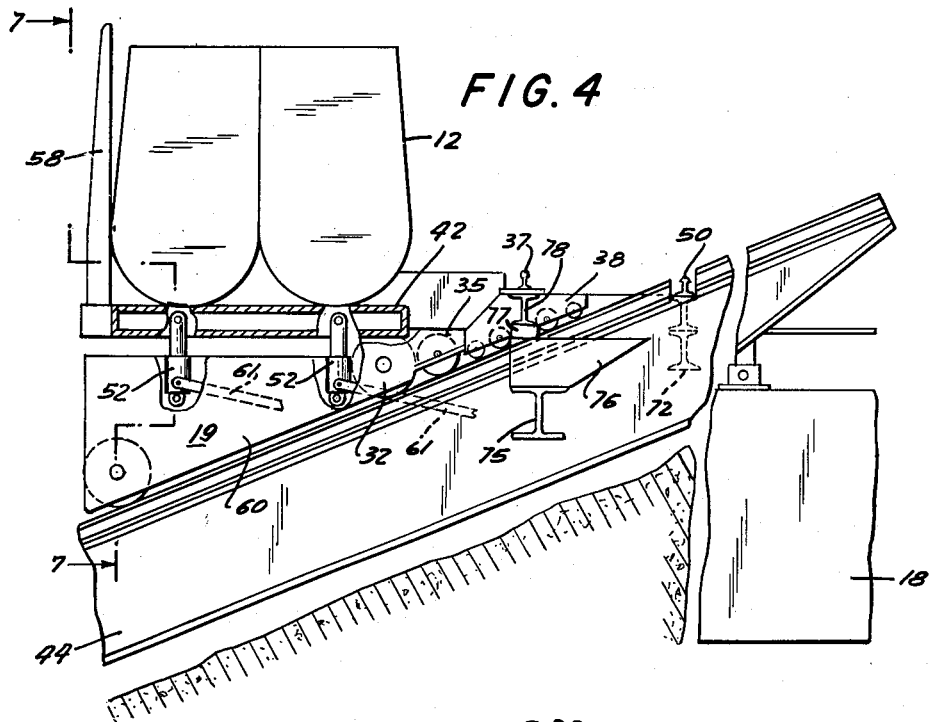
FIG. 4 shows on an enlarged scale the manner in which the structure of FIG. 1 is capable of moving a rail of one track out of the way so as not to interfere with the movement of a carriage of another track.
Figure 6:
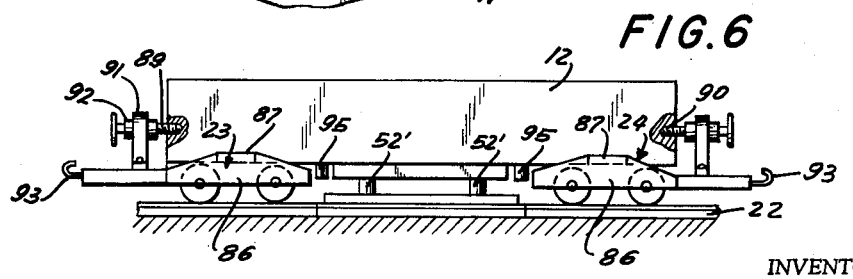
Figure 7:
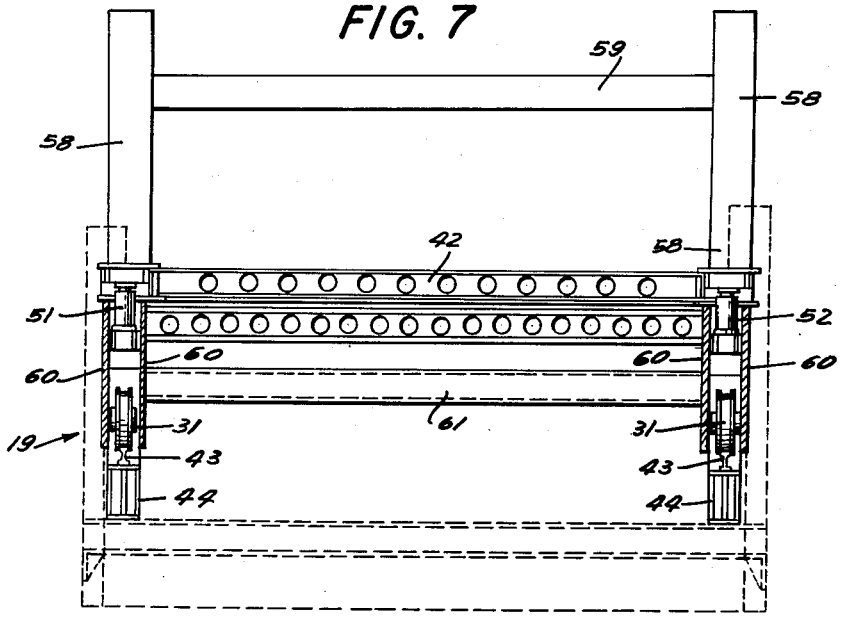
Figure 8:
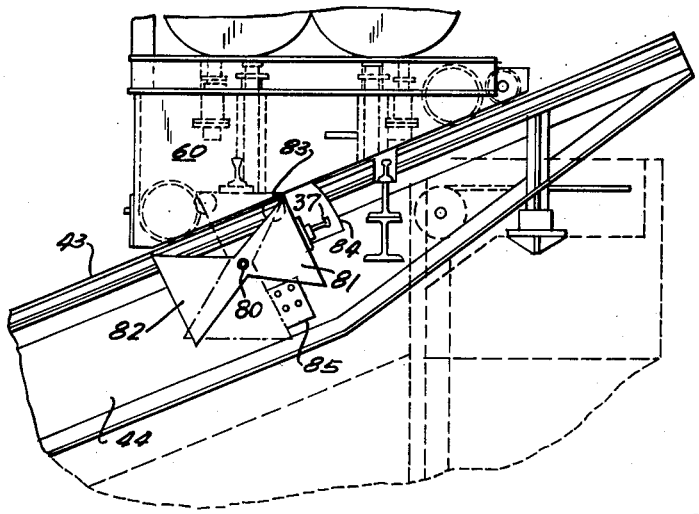

FIG. 6 fragmentarily illustrates an embodiment of the invention different from that of FIG. 4 and wherein a hydraulic means which transfers the vessel from one carriage means to another carriage means is mounted on the land rather than on a carriage which is movable along a track;

FIG. 7 is a transverse sectional elevational view of a carriage of the present invention, FIG. 7 showing not only the details of the carriage but also how a hydraulic means is mounted on this carriage; and FIG. 8 is a fragmentary side elevational view illustrating another embodiment of a structure for supporting a movable rail for movement between an active operating position and an inactive position where the rail does not interfere with the movement of a carriage along the track.

Referring to FIG. 1, there is illustrated therein a body of water 13 and an adjoining body of land 26 having a shore line 14 located along the edge of the body of water 13. Floating in the body of water 13 is a group of vessels 10, and in the example shown in FIG. 1 and described below it is assumed that the vessels are being transferred to the body of land 26, although it is to be understood that the present invention may be used for the reverse operation where the vessels are transferred from the land to the water.

Each of the vessels 12 which make up the group of vessels 10 is itself made up of a pair of interconnected vessels 11, as shown in FIG. 1A, such a pair of interconnected vessels 11 being provided for a purpose having nothing to do with the present invention. Thus, in an unillustrated manner the vessels 11 which cooperate to form a single vessel 12 are capable of turning in opposite direction with respect to each other when they are on the land so as to quickly unload the goods which they carry.

For the purposes of the present invention each pair of connected vessel portions 11 may be considered as a single vessel 12. A considerable difficulty is involved in moving each vessel 12 from the group 10 to a precisely determined position where each vessel 12 can be efficiently handled so as to be raised out of the water 13 onto the land 26, in accordance with the present invention, and a structure for doing away with this difficulty is shown in FIGS. 1, 1A, and 1B. This structure includes a track 15 which is located over the body of water 13. As may be seen particularly from FIG. 1A, the track 15 is in a form of a railroad track supported on a framework 27 which is carried by a plurality of piles 16 arranged in the body of water 13. A vessel moving means is movable along the track 15, and this vessel moving means includes the cars 20 which may be of any known construction and which are capable of being self-propelled along the track 15. For example, these cars 20 may be battery driven electric cars. Each of the cars 20 carries an arm 25 which extends downwardly from a side of a car, and each arm 25 has an upper part 28 of considerable weight capable of sliding up and down the right side of a car 20, as seen in FIG. 1A. Each part 28 of each arm 25 is formed with a threaded bore, and a crank 29 has a threaded portion cooperating with the threaded bore of the arm 25, and the crank 29 is turnably supported by a pair of brackets 30 and is connected by suitable collars to the brackets 30 so that crank 29 cannot move axially. Thus, when the operator turns the crank 29 the arm 25 will be raised or lowered.

Each vessel 12 has at its ends a pair of projections 32, respectively, and each arm 25 terminates at its bottom end in a part 31 formed with an opening adapted to receive a projection 32, as indicated in FIG. 1A. Thus, a pair of operators on a pair of cars 20 move the cars along the track 15 until the ends 31 of the arms 25 of such a pair of cars are located over a pair of projections at the ends of a vessel 12, and then the operators manipulate the cranks 29 of the cars 20, respectively, so as to lower the arms 25 and to locate the projections 32 in the pair of arms. A vessel 12 connected in this way to a pair of cars 20 is shown diagrammatically in FIG. 1. Thereafter, the cars are propelled so as to very easily and quickly maneuver each vessel 12 to the position shown in dot-dash lines in FIG. 1, and a suitable abutment 33 is provided for the lead car 20 in order to provide a precise location for this lead car.

The structure of the present invention includes an inclined railroad track 17 having a bottom end submerged beneath the surface of the body of water 13 and supported by a suitable framework, described below. The track 17 extends from its bottom end upwardly out of the body of water 13 and onto the body of land 26. A carriage 19, the details of which are described below, is movable along the track 17 and when it is located at the submerged end of the track 17, as shown in dotted lines in FIG. 1, the carriage 19 is itself submerged and is located at a depth which is lower than the vessel 12 so that the latter can float over the carriage 19 when the vessel 12 is moved by the vessel moving means 20, 25 to the position shown in dot-dash lines in FIG. 1. The location of the abutment 33 is such that the vessel 12 will be centrally positioned with respect to the carriage 19, which is to say that the end portions of the vessel 12 which extend beyond the ends of the carriage 19, will have equal lengths so that the weight of the vessel 12 will be evenly supported on the carriage 19 and there will be no possibility of tipping of the vessel.

The apparatus of the present invention includes a pulling means 21 the details of which are also described below. This pulling means 21 includes a pair of winches and cables or chains which extend from the pulling means 21 along the track 17 and are connected to the carriage 19, so that the pulling means 21 may be actuated for pulling the carriage 19 along the track 17 upwardly out of the water. The carriage 19 has an upwardly directed wall which engages the side of the vessel 12 which is directed away from the body of land 26, and the carriage 19 also has a wall located beneath the vessel 12, so that when the pulling means 21 is actuated to move the carriage 19 upwardly along the track 17, the vessel 12 will automatically become located on the carriage 19 and will move out of the body of water 13 together with the carriage 19. Of course, before the pulling means 21 is actuated the cranks 29 are manipulated by the operators of the pair of cars 20 so as to remove the arm 25 from the vessel 12 so that the latter is now free to be engaged and moved by the carriage 19.

It will be noted that the top end of the track 17, which is located adjacent to the pulling means 21, extends between a pair of carriages 23 and 24 which are movable along a second track 22 carried solely by the body of land 26 and intersecting at substantially a right angle with the track 17. The details of the structure of the tracks 22 and 17, particularly at their intersection, is described below. When the carriage 19 has been pulled by the pulling means 21 to the top end of the track 17, the vessel 12 will have its ends respectively located over the pair of carriages 23 and 24, and then by actuation of a hydraulic means which is described below the vessel is lowered onto the pair of carriages 23 and 24, so that the pair of carriages 23 and 24 form a second carriage means to which the vessel is transferred from the carriage 19. With the ends of the vessel 12 resting on the carriages 23 and 24, the vessel 12 is connected with the carriages 23 and 24 by a structure described below, and in this way the vessel 12 together with the carriages 23 and 24 provide a single vehicle assembly which is capable of being moved along the track 22, so that the seagoing vessel 12 has now been converted into part of a vehicle assembly which is movable on the body of land 26.

Once the vessel 12 has been lowered onto the carriages 23 and 24, the pulling means 21 is actuated so as to release the carriage 19 for movement by gravity back down to the submerged end of the track 17, and now the carriage 19 is ready to have the next vessel 12 moved into position to be engaged by the carriage 19. It will be noted from FIG. 1 that while the carriage 19 moves up the track 17 it is possible for the pair of cars 20 to return to the distant end of the track 15 to receive the next vessel 12 and to maneuver the latter into position, so that all of the above operations can be timed in such a way that the transfer of the vessels 12 from the body of water 13 to the body of land 26 takes place very rapidly and in an extremely simple way.

FIG. 2 shows how the body of land 26 extends beneath the body of water 13, and FIGS. 2 and 3 show the base members 18 which carry a framework which in turn carries the track 17. In accordance with the present invention these members 18 are arranged along the track 17 but are located laterally beyond the track 17 so that there are no base members 18 beneath the track 17 or between the pair of rails 43 of the track 17. A framework of beams 44, 45 is carried by the plurality of base members 18 and supports the pair of rails 43. This framework includes a pair of elongated side frame members 44 which are located in vertical planes, which are parallel to each other, and which directly carry at their top surfaces the pair of rails 43, respectively. The pair of side beams 44 are interconnected with each other through the framework 44' indicated in FIG. 3, and the entire framework 44, 44' is carried by the beams 45 which are directly connected with the base members 18 including the upper base members 18. With this arrangement the track 17 is very strongly supported and at the same time there is provided between the pair of rails 43 and for a substantial distance below these rails a free space capable of receiving cables 55 which are connected with the carriage 19 to pull the latter. Also, the side beams 44 turnably carry at their inner faces which are directed toward each other a pair of pulleys 56 indicated in FIG. 3 and guiding the cables 55. The pair of beams 44 furthermore fixedly carry at their bottom ends a pair of stop members 57 shown at the lower left part of FIG. 2 which are engaged by the carriage 19 to limit the downward movement thereof and to locate the carriage 19 at the submerged end of the track 17 at such a depth that each vessel 12 can be floated to a position over the carriage 19, as indicated in FIG. 2. FIG. 2 shows how the carriage 19 is provided with a horizontal top wall 42 located beneath the vessel 12, and this wall 42 remains horizontal at all times. Also, the carriage 19 includes vertical beams 58 which engage the side of the vessel 12 directed away from the top end of the track 17. It is apparent from FIG. 2 that as the carriage 19 is pulled upwardly along the track 17 the wall 42 of the carriage 19 will engage the bottom of the vessel 12 while the beams 58 will keep the vessel 12 moving to the right, as viewed in FIG. 2 with the carriage 19, so that in this way the continued movement of the carriage 19 to the right, as viewed in FIG. 2, will result in raising of the vessel 12 upwardly out of the body of water 13 onto the land, as is shown at the upper right portion of FIG. 2.

FIG. 7 clearly shows the pair of vertical beams 58 which engage the side of the vessel 12 which is directed away from the top end of the track 17 as well as a cross beam 59 extending between and reinforcing the beams 58. These beams 58 are fixedly connected with the top wall 42 of the carriage, and this top wall 42 itself is in the form of a framework of interconnected beams. Furthermore, the top wall 42 is vertically movable with respect to the lower part of the carriage which is located beneath and supports the top wall 42 for a purpose described below.

The lower part of the carriage 19 includes at each side of the carriage a pair of interconnected parallel walls 60 which are of substantially triangular configuration, as is evident from FIGS. 2 and 4, and which are connected to each other and maintain spaced from each other in the manner shown in FIG. 7 by suitable spacers. A number of beams 61 extend between the pair of inner walls 60 which are directed toward each other so as to fix the two sides of the lower part of the carriage to each other. Between each pair of walls 60 are turnably mounted the wheels which ride on the tracks 43, and FIG. 7 shows the pair of trailing wheels 31 located at the lowest part of the carriage 19.

Between each pair of walls 60 there is also fixedly mounted a hydraulic means in the form of a pair of hydraulic pistons and cylinders. Thus, the piston and cylinder assemblies 51 and 52 are indicated in FIG. 7 and these hydraulic assemblies are connected with the top wall 42 so that when the pistons move out of the cylinders the top wall 42 as well as the beams 58 will be raised with respect to the lower part of the carriage. FIG. 4 shows the pair of hydraulic assemblies 52 carried by the right pair of walls 60 of FIG. 7, and a similar pair of hydraulic assemblies 51 are carried by the left wall. Thus, by actuating these hydraulic assemblies it is possible to raise and lower the wall 42 which remains at all times horizontal. Flexible hydraulic conduits 61 are connected with the hydraulic assemblies 51 and 52 and extend from a suitable control point to the hydraulic assemblies, these flexible lines 61 being long enough to remain at all times in operative engagement with the hydraulic assemblies from the time that the carriage 19 is at its lowest point, as shown at the left of FIG. 2, up to the time that the carriage is at its highest point as shown at the right of FIG. 2, and at this control point suitable valves are located so as to direct the hydraulic fluid such as oil or the like under pressure in the desired direction through the lines 61 into and out of the cylinders of the hydraulic assemblies so that in this way an operator at this control point can control the elevation of the top wall 42 with respect to the lower part of the carriage 19.

The pairs of walls 60 of the carriage means 19 are turnably connected with two pairs of wheels in addition to the wheels 31. Thus, these walls are turnably connected with a leading pair of wheels 35 and 36 shown in FIG. 3, and these wheels 35 and 36 are located slightly in advance of an intermediate pair of wheels 32 and 33 for a purpose described below. The wheels are at all times in engagement with the rails 43 of the track 17.

As may be seen from FIGS. 2 and 3, the pulling means 21 is located in a suitable concrete foundation 70 which is built into the body of land 26. This pulling means includes an electric driving motor 62 connected with any suitable source of current and capable of being turned on and off by the operator, and this motor 62 drives through a suitable gear transmission 63 an elongated shaft 64 which rotates so as to drive the pinions 65 which in turn mesh with gears connected with the ends of the winches 66 on which the cables 55 are respectively wound. Thus, by suitably operating the motor 62, which may be a reversible motor, the winches 66 may be turned so as to pull the cables 55 to the right. The free ends of cables 55 are hooked on to the hooks 67 which are fixed to the inner side of the side walls of the carriage 19, as indicated in FIG. 3, so that when the cables 55 are pulled to the right, as viewed in FIG. 3, the carriage 19 will be moved upwardly along the track 17. When the direction of rotation of the motor 62 is reversed the cables 55 are payed out and the carriage 19 moves down the track 17 simply by gravity.

As was pointed out above in connection with FIG. 1, the inclined track 17 intersects with a horizontal track 22 supported only by the body of land 26, and in accordance with the present invention the track 22 intersects at a right angle with the track 17. At the portion of the track 22 which intersects with track 17, the track 22 has a stationary rail 50 (FIG. 5) and a movable rail 37. The pair of rails 43 are provided with a pair of aligned interruptions 71 through which the stationary rail 50 passes, the stationary rail portion 50 being supported by suitable beams 72 (FIG. 4) carried by the pair of side beams 44. Thus, the stationary rail 50 forms part of that rail of the track 22 which is more distant from the body of water 13.

The stationary rail 50 cooperates with the movable rail portion 37 to form part of the track 22, and in the active operating position of the rail portion 37 which is illustrated in FIG. 4, this rail portion 37 is located in a common horizontal place with the stationary rail 50 while being parallel thereto and located over the rails 43 which extend beneath the rails 37 and when the rails 37 and 43 are projected onto a common horizontal plane they intersect each other at right angles.

It is apparent that if the track 22 included a rail portion 37 which was fixedly mounted in the position indicated in FIG. 4, the carriage 19 could not move up to the necessary elevation, and in accordance with the present invention a means is provided which mounts the movable rail portion 37 for movement from its active position indicated in FIG. 4 to an inactive position where it does not interfere with the movement of the carriage 19 up to the desired elevation.

In the example illustrated in FIGS. 2–5 the means which movably support the rail 37 includes a carriage 38 having side walls located in vertical plane in which the rails 43 are also substantially located, and each of the side walls of the carriage 38 is provided with three wheels which engage the rails 43. Thus, the six wheels 39 of the carriage 38 are divided into a leading pair of wheels, an intermediate pair of wheels and a trailing pair of wheels with the leading pair of wheels being shown at the right in FIGS. 2 and 4 and located at a higher elevation than the intermediate pair of wheels which are in turn located higher than the trailing pair of wheels 39. The side walls 38 are interconnected with each other by a suitable I-beam 78 or the like which additionally serve to support the movable rail portion 37. When this rail portion 37 is in the active position thereof which is indicated in FIG. 4, the rail portion 37 forms a part of that rail of the track 22 which is nearer to the body of water 13.

The carriage 38 is free to move up and down the track 17 in the same way as the carriage 19, except that a stop means is provided in accordance with the present invention to limit the downward movement of the carriage 38 to the position indicated in FIG. 4 which locates the rail 37 at the same elevation as the rail 50. This stop means includes a pair of end portions of an I-beam 75 which respectively extend beyond the outer surfaces of the side beams 44, and each end portion 75 carries a rigid member 76 provided on its top face with a plate 77. The beam 78 which extends between the side walls of the carriage 38 and supports the rail portion 37 also has free end portions extending slightly beyond the walls 38, and to the bottom sides of these free end portions are respectively fixed a pair of plates 79. During the downward movement of the carriage 38 along the track 17 toward the position of the carriage 38 shown in FIG. 4 from the position thereof indicated at the right of FIG. 2, there comes a time when the plates 79 respectively abut against the plates 77 and the carriage 38 cannot move beyond this point downwardly along the track 17, and at this time the rail portion 37 is located precisely in the position indicated in FIG. 4 where it forms a continuation of the rail of the track 22 which is located nearer to the body of water 13. If desired, each pair of plates 77 and 79 may be formed with aligned openings through which pins may be placed for locking the carriage 38 in the position indicated in FIG. 4, and in this case it is of course necessary to remove these pins when the carriage 19 is operated. However, when the carriage 19 is not operated such pins serve to lock the carriage 38 in a position indicated in FIG. 4.

It will be noted from FIGS. 2 and 4 that the carriage 38 has its left end, as viewed in FIGS. 2 and 4, located in the path of movement of the leading end of the carriage 19 as the latter moves upwardly along the track 17. As a result, during upward movement of the carriage 19 the leading end of this carriage engages the carriage 38 and moves the latter in advance of the carriage 19 up the track 17, and as a result the rail portion 37 does not interfere with the movement of the carriage 19. When the carriage 19 returns to the left position thereof shown in FIG. 2, the carriage 38 simply follows the carriage 19 by gravity until the plates 79 respectively engage the plates 77, and then the carriage 19 continues its downward movement without being followed by the carriage 38. In this way the rail portion 37 is automatically moved to and from its active operating position indicated in FIG. 4 simply by the movement of the carriage 19.

Another embodiment of a means for movably supporting the rail portions 37 is illustrated in FIG. 8. In this embodiment the side beams 44 support a shaft 80 which extends across and through the beams 44 and which has free ends located laterally beyond the beams 44. A pair of substantially triangular rigid plates 81 are turnably supported on the free ends of the shaft 80, respectively, and the beams 44 are located between the plates 81. The pair of plates 81 are respectively fixed to weights 82 which by gravity act on the plates 81 so as to urge them to a position which locates the rail portion 37 in its active operating position where it is in the same horizontal plane as the stationary rail member 50. The plates 81 are fixed with and carry the rail portion 37. Each plate 81 turnably carries at its upper left end, as viewed in FIG. 8, a roller 83, and the rollers 83 are respectively located in the same planes as the outer plates 60 at each side of the carriage 19. Furthermore, the rails 43 are formed with a pair of interruptions through which the rail portion 37 can turn during turning of the plates 81, and the beams 44 are respectively formed with actuate cutouts 84 whose center of curvature is in the axis of the shaft 80 and which respectively form continuations of the interruptions in the rails 43. Thus, as the carriage 19 moves up the track 17, first the leading end of the carriage 19 and then the lower edges of the outer side plates 60 will respectively engage the rollers 83 to automatically turn the plates 81 against the force of the weights 82 in a clockwise direction, as viewed in FIG. 8, so that the rail portion 37 also turns in a clockwise direction through the interruptions in the rails 43 and downwardly into the cutouts 84, and the rail portion 37 is maintained in this inactive position by the carriage 19 itself, so that in this way with the embodiment of FIG. 8 also the rail portion 37 does not interfere with the movement of the carriage 19 to the desired elevation. When the carriage 19 returns to its lowermost position, the weights 82 simply turn the plates 81 by gravity back to the position where they locate the rail portion 37 in its active position. A pair of stop plates 85 are fixed to the outer side surfaces of the beams 44 and are in engaged by the right edges of the weights 82, as viewed in FIG. 8, so as to precisely determine the location of the rail portion 37 in the active position thereof.

Figure 5:
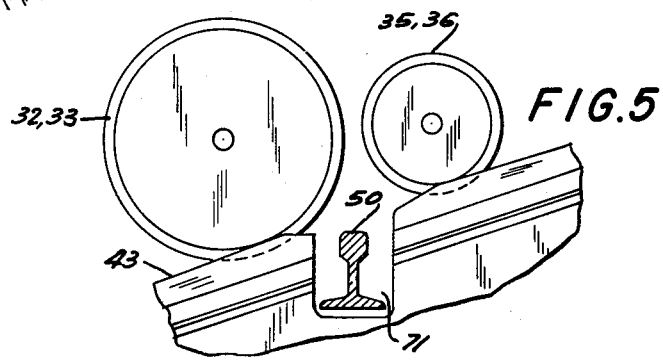
FIG. 5 is a fragmentary elevational view on an enlarged scale showing how a carriage of the structure of the FIGS. 2–5 is capable of moving over an interruption in a rail without being disturbed in its movement by this interruption.

The manner in which the carriages 19 and 38 move over the interruptions 71 of the rails 43 or over the interruptions of the rails 43 shown in the embodiment of FIG. 8 is shown in detail in FIG. 5 where the leading pair of wheels 35 and 36 and the intermediate pair of wheels 32 and 33 of the carriage 19 are shown together with the rail 43 and the stationary rail member 50 which passes through the aligned interruptions 71. It will be understood that the operation now to be described in connection with FIG. 5 is true of the movement of the carriage 19 over the rail interruptions in FIG. 8 and is also true of the movement of the carriage 38 over the interruptions 71. It will be noted that the pair of wheels 35 and 36 engage the rails 43 at a point which is spaced from the points of the rails 43 engaged by the wheels 32 and 33 by a distance longer than the length of the interruptions 71. Thus, as the wheels 35 and 36 pass over the interruptions 71 the carriage is supported only by the trailing pair of wheels and the intermediate pair of wheels. When the intermediate pair of wheels pass over the interruptions the carriage is supported by the leading and trailing pairs of wheels, and at its uppermost position the interruptions are located between the trailing pair of wheels and the intermediate pair of wheels. In this way the carriage moves without any difficulty over the interruptions 71, and it is apparent that the same is true during the downward movement of the carriage.

As may be seen from FIG. 3, a carriage means made up of the pair of carriages 23 and 24 is located on the track 22 and the pair of carriages 23 and 24 are so positioned that the carriage 19 moves upwardly into the space between the carriages 23 and 24, and the tops of these carriages are low enough so that the vessel 12 can move over the carriages and become located directly above the same when the carriage 19 reaches its uppermost position. Each carriage 23 and 24 is provided with a cradle 87 onto which the vessel 12 is lowered. As the carriage 19 moves up the track 17 the hydraulic means 51 and 52 are actuated so as to raise the upper wall 42 of the carriage 19, and then when the vessel 12 is located over the cradles 87 the hydraulic means are actuated so as to lower the wall 42 and as a result the vessel 12 becomes located on the cradles 87 while the wall 42 continues to move downwardly until it reaches its lowermost position where it is spaced beneath the vessel 12, and then the carriage 19 can be returned to its submerged position ready to receive the next vessel 12.

Each carriage 23 and 24 includes two pairs of wheels which roll on the track 22, and FIG. 3 shows the pairs of wheels 48 of the carriage 22 as well as the pairs of wheels 49 of the carriage 23. Each pair of these wheels is turnably connected at a central portion of its axle with the platform 86 of each carriage for turning movement about a vertical axis which coincides with the axis of a vertical bar 88 fixed to the central portion of the axle to each pair of wheels and extending upwardly from this axle into a suitable bearing of the carriage, as is diagrammatically indicated in FIG. 3, so that the carriages 23 and 24 are capable of moving along curved portions of the track 22.

When the vessel 12 has been lowered onto the carriages 23 and 24, as shown in FIG. 6, elongated threaded bolts 89 are threaded into threaded bores 90 at the end walls of the vessel 12. These bolts 89 are turnably supported by upstanding portions 91 of each carriage, and once the bolts 89 are in threaded engagement with the ends of the vessel 12, lock nuts 92 are turned against the upstanding portion 91 of the carriages so that in this way the vessel 12 is quickly and easily fixed with the carriages 23 and 24. Each carriage is provided with a hook 93 or the like so that it can be connected to other carriages in order to form a car of a train which is moved by locomotive means along the track 22.

With the structure described above, the hydraulic means is carried by the carriage 19. It is also possible to provide an arrangement where the hydraulic means is mounted on the body of land 26 instead of on the carriage 19, and such a hydraulic means 52' is shown in FIG. 6. The hydraulic means 52' is located directly on the body of land 26 at the intersection of the tracks 17 and 22, and in this case the carriage 19 is formed at the front end of its top wall 42 with a pair of forwardly extending extensions 95 between which the top end 96 of the hydraulic means 52' becomes located during movement of the carriage 19 to its uppermost position. Thus, with this construction the front elongated portions 95 of the carriage 19 has a configuration similar to that of a fork of a lift truck. With the vessel 12 mounted on this carriage 19, and when this carriage 19 is at its uppermost position which is illustrated in FIG. 6, the hydraulic means 52' is actuated so as to raise the vessel 12 from the carriage 19 which then can move back down by gravity, and then the hydraulic means 52' is lowered so as to lower the vessel 12 onto the pair of carriages 23 and 24, and thereafter the bolts 89 are connected with the ends of the vessel 12 in a manner described above so that in this way the vessel 12 together with the carriages 23 and 24 cooperate to form a single vehicle assembly which is movable along the track 22.

The above described process and apparatus may be used for transporting any desired goods such as oils, coke, and the like. With the method and apparatus of the invention it is unnecessary to transport the goods between sea- and landgoing vehicles. The goods remains in the vessels until the goods reaches its final destination. The transfer from sea to land or land to sea takes place very quickly, and the entire apparatus of the invention requires but a small space and a minimum number of personnel for its operation. Furthermore, the costs of constructing the structure of the present invention is extremely low when compared to the costs of conventional installations for transferring goods from land to sea and vice versa.

It will be understood that each of the elements described above, or two or more together, may also find a useful application in other types of method and apparatus for amphibious transportation of goods differing from the types described above.

While the invention has been illustrated and described as embodied in railroad track arrangements for use in the amphibious transportation of goods, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for amphibiously transporting goods, in combination, a first inclined track extending between a body of water and an adjoining body of land; a second horizontal track located only on the body of land and having a pair of rails which intersect with said first track, one of said pair of rails being located nearer to the body of water than the other of said pair of rails and said one rail having a portion extending across said first track at an elevation higher than the part of said first track across which said portion of said one rail extends, the other of said pair of rails extending across said first track at the same elevation as the part of said first track across which said other rail extends; and means supporting said portion of said one rail for movement to a position where said portion of said one rail does not interfere with the movement of a carriage along said first track to a position where the carriage extends at least partly over said other rail at said portion of said other rail which extends across said first track.

2. In an apparatus for amphibiously transporting goods, in combination, a first inclined track extending between a body of water and an adjoining body of land, said first track extending from a place where said first track is submerged beneath the surface of the body of water, upwardly out of the body of water onto the body of land; a second horizontal track located only on the body of land and extending substantially perpendicularly across said first track, said second track having a pair of rail portions which extend across said first track and one of which is located nearer to the body of water than the other, said one rail portion being located at a higher elevation than the part of said first track across which said one rail portion extends; and means supporting said one rail portion for movement to a position where said one rail portion does not interfere with the movement of a carriage along said first track to a position where the carriage extends in part over the other of said rail portions of said second track.

3. A railroad track arrangement, comprising, in combination, an inclined railroad track having a bottom end and extending upwardly from its bottom end to a top end of said inclined railroad track; a stationary horizontal rail extending across and intersecting with said inclined track between said ends thereof; a movable horizontal rail having an operating position where said movable rail is parallel to and in the same horizontal plane as said stationary rail and is located nearer to the bottom end of said inclined track than said stationary rail with said inclined rail extending beneath said movable rail; and means supporting said movable rail for movement from said active position thereof to an inactive position where said movable rail is located out of the path of movement of a carriage on said inclined track.

4. A railroad track arrangement comprising, in combination, an inclined railroad track having a bottom end and extending upwardly from said bottom end to a top end of said inclined track; a stationary rail located in a horizontal plane and extending across and intersecting with said inclined track between said ends thereof; a movable rail having an active position parallel to and located in the same horizontal plane as said stationary rail to form part of a second track therewith, said movable rail when it is in said active position thereof being located between said stationary rail and said bottom end of said inclined track; a carriage carrying said movable rail and being movable along said inclined track; and stop means located adjacent said inclined track and cooperating with said carriage for limiting the movement of said carriage downwardly along said inclined track to an elevation which locates said movable rail in said active position thereof, so that a second carriage which is located lower than said first-mentioned carriage will engage said first carriage when said second carriage moves up said track to move said first carriage and said movable rail therewith in advance of said second carriage upwardly along said inclined track so that said movable rail will not interfere with the movement of said second carriage along said inclined track.

5. A railroad track arrangement comprising, in combination, an inclined railroad track having a bottom end and extending upwardly from said bottom end to an opposite top end of said inclined track, said inclined track including a pair of parallel rails respectively formed between said ends of said inclined track with a pair of aligned interruptions; a stationary rail intersecting with and extending across said inclined track between said ends thereof and extending through said interruption of said rails of said inclined track; a movable rail having an active position where said movable rail is parallel to and located in a common horizontal plane with said stationary rail to form a second track therewith, said movable rail when it is in its active position being located between said stationary rail and the bottom end of said inclined track; a pair of vertical wall members carrying said movable rail and respectively located substantially in a pair of parallel vertical planes in which the rails of said inclined track are also located; a leading pair of wheels turnably connected with said pair of walls and rolling on said inclined track; a trailing pair of wheels turnably connected with said pair of walls, respectively, and also rolling on said inclined track; and an intermediate pair of wheels turnably connected with said pair of walls, respectively, and rolling on said inclined track, said intermediate pair of wheels being located between said leading and trailing pairs of wheels and said trailing pair of wheels being located nearer to the bottom end of said inclined track than said leading pair of wheels, the distance between the point where each leading wheel engages a rail of said inclined track and the point where each intermediate wheel engages a rail of said inclined track being greater than the length of each interruption, so that a carriage formed by said wheels and walls is movable together with said movable rail over said interruption in each rail of said inclined track without the movement of said carriage being disturbed by said interruption from a position where said carriage is located with all of its wheels lower than said interruptions to a position where the interruptions are located between the intermediate and trailing wheels of the carriage; and stop means located adjacent said inclined track and cooperating with said carriage for limiting the movement thereof downwardly along said track to a position where said movable rail is located in its active position.

6. A railroad track arrangement comprising, in combination, an inclined railroad track having a bottom end and extending upwardly from said bottom end to an opposite top end of said inclined track, said inclined track including a pair of parallel rails respectively formed between said ends of said inclined track with a pair of aligned interruptions; a stationary rail intersecting with an extending across said inclined track between said ends thereof and extending through said interruption of said rails of said inclined track; a movable rail having an active position where said movable rail is parallel to and located in a common horizontal plane with said stationary rail to form a second track therewith, said movable rail when it is in its active position being located between said stationary rail and the bottom end of said inclined track; a pair of vertical wall members carrying said movable rail and respectively located substantially in a pair of parallel vertical planes in which the rails of said inclined track are also located; a leading pair of wheels turnably connected with said pair of walls and rolling on said inclined track; a trailing pair of wheels turnably connected with said pair of walls, respectively, and also rolling on said inclined track; an intermediate pair of wheels turnably connected with said pair of walls, respectively, and rolling on said inclined track, said intermediate pair of wheels being located between said leading and trailing pairs of wheels and said trailing pair of wheels being located nearer to the bottom end of said inclined track than said leading pair of wheels, the distance between the point where each leading wheel engages a rail of said inclined track and the point where each intermediate wheel engages a rail of said inclined track being greater than the length of each interruption, so that a carriage formed by said wheels and walls is movable together with said movable rail over said interruption in each rail of said inclined track without the movement of said carriage being disturbed by said interruption from a position where said carriage is located with all of its wheels lower than said interruptions to a position where the interruptions are located between the intermediate and trailing wheels of the carriage; stop means located adjacent said inclined track and cooperating with said carriage for limiting the movement thereof downwardly along said track to a position where said movable rail is located in its active position; and a second carriage movable along said inclined track and located between said first-mentioned carriage and the bottom end of said track, said second carriage having a leading end directed toward the top end of said inclined track and said first-mentioned carriage being located in the path of movement of said leading end of said second carriage so that when said second carriage moves up said inclined track said leading end thereof will engage said first-mentioned carriage and move the latter in advance of said second carriage upwardly along said inclined track so that said movable rail does not interfere with the movement of said second carriage along said inclined track.

7. A railroad track arrangement comprising, in combination, an inclined railroad track having a bottom end and extending upwardly from its bottom end to an opposite top end of said inclined track; a stationary horizontal rail extending across and intersecting with said inclined track between said ends thereof; a movable rail having an active position parallel to and located in the same horizontal plane as said stationary rail to form part of a second track therewith, said movable rail when it is in its active position being located over said inclined track between said stationary rail and the bottom end of said inclined track; and means supporting said movable rail for turning movement from said active position thereof to an inactive position where said movable rail will not interfere with the movement of a carriage along said inclined track.

References Cited in the file of this patent

UNITED STATES PATENTS

| | | |
|---|---|---|
| 130,768 | Thompson | Aug. 20, 1872 |
| 266,360 | Greene | Oct. 24, 1882 |
| 350,242 | Grondahy | Oct. 5, 1886 |
| 738,190 | Healy | Sept. 8, 1903 |
| 766,956 | Lennon | Aug. 9, 1904 |

(Other references on following page)

UNITED STATES PATENTS

| | | | |
|---|---|---|---|
| 1,263,651 | D'Amico | Apr. 23, | 1918 |
| 1,298,499 | Hansen | Mar. 25, | 1919 |
| 2,371,721 | Walters | Mar. 20, | 1945 |
| 2,570,161 | Schwartz | Oct. 2, | 1951 |

FOREIGN PATENTS

| | | | |
|---|---|---|---|
| 7,921 | Great Britain | May 19, | 1884 |
| 288,478 | Great Britain | Apr. 12, | 1928 |
| 315,627 | Great Britain | July 18, | 1929 |
| 806,528 | Germany | June 14, | 1951 |